United States Patent
Smith

(10) Patent No.: US 8,820,084 B2
(45) Date of Patent: Sep. 2, 2014

(54) APPARATUS FOR CONTROLLING A BOUNDARY LAYER IN A DIFFUSING FLOW PATH OF A POWER GENERATING MACHINE

(75) Inventor: Bruce L. Smith, Oviedo, FL (US)

(73) Assignee: Siemens Aktiengesellschaft, München (DE)

(*) Notice: Subject to any disclaimer, the term of this patent is extended or adjusted under 35 U.S.C. 154(b) by 273 days.

(21) Appl. No.: 13/170,230

(22) Filed: Jun. 28, 2011

(65) Prior Publication Data

US 2013/0000305 A1     Jan. 3, 2013

(51) Int. Cl.
   *F01D 25/30*   (2006.01)
   *F02K 1/28*    (2006.01)
   *F02C 3/06*    (2006.01)

(52) U.S. Cl.
   CPC ........... *F02C 3/06* (2013.01); *F05D 2240/127* (2013.01); *F02K 1/28* (2013.01); *F05D 2270/17* (2013.01); *F01D 25/305* (2013.01); Y10S 415/914 (2013.01)
   USPC ............ 60/694; 60/39.17; 60/697; 415/914

(58) Field of Classification Search
   CPC . F05D 2240/127; Y02T 50/166; F01D 25/30; F01D 25/305
   USPC ................. 60/39.17, 685–687, 694, 697; 415/115–117, 914
   See application file for complete search history.

(56) References Cited

U.S. PATENT DOCUMENTS

| | | | |
|---|---|---|---|
| 2,650,752 A * | 9/1953 | Hoadley ................. | 415/194 |
| 3,641,766 A * | 2/1972 | Uehling ................. | 60/262 |
| 4,349,314 A | 9/1982 | Erwin | |
| 4,502,837 A | 3/1985 | Blair et al. | |
| 6,682,021 B1 * | 1/2004 | Truax et al. .............. | 244/201 |
| 6,926,495 B2 | 8/2005 | Diakunchak | |
| 7,387,488 B2 | 6/2008 | Nicholas et al. | |
| 7,549,282 B2 * | 6/2009 | Widenhoefer et al. ..... | 60/39.17 |
| 7,854,591 B2 | 12/2010 | Liang | |
| 2007/0258815 A1 | 11/2007 | Liang | |
| 2009/0252602 A1 | 10/2009 | Diakunchak | |
| 2010/0068068 A1 | 3/2010 | Liang | |

* cited by examiner

Primary Examiner — Thomas Denion
Assistant Examiner — Laert Dounis

(57) ABSTRACT

An apparatus (10) is presented for controlling a boundary layer (30) in a diffusing flow path (14) of a power generating machine (16). The apparatus includes a passage (18) in the power generating machine with an inlet (20) and an outlet (22). The apparatus also includes a fluid source (24) coupled to the inlet to transmit fluid into the passage. The apparatus also includes a vortex generator (26) within the passage effective to generate a vortex fluid (12) at the outlet. The outlet is positioned to inject the vortex fluid into the diffusing flow path of the power generating machine in order to control the boundary layer of the diffusing flow path. An apparatus is also provided to enhance the diffusion of a flow path within a power generating machine.

15 Claims, 4 Drawing Sheets

APPARATUS FOR CONTROLLING A BOUNDARY LAYER IN A DIFFUSING FLOW PATH OF A POWER GENERATING MACHINE

FIELD OF THE INVENTION

Aspects of the invention are related to diffusers, and more particularly, to a diffusing flow path of a diffuser within a power generating machine.

BACKGROUND OF THE INVENTION

In a gas turbine engine power generating machine, air is initially compressed by an air compressor, is subsequently heated in a combustion chamber, and the combustion gas so produced passes to a turbine that, driven by the combustion gas, does work which may include rotating the air compressor. Generally, the combustion gas flows out of the turbine and into a diffuser, which expands the flow of combustion gas in a diffusing flow path before exiting the gas turbine engine or entering a subsequent component, such as a Heat Recovery Steam Generator, for example.

In conventional gas turbine engine diffusers, the combustion gas flowing through the diffusing flow path typically includes a boundary layer usually comprised of stagnant fluid which is a "separated" region along an outer surface of the diffusing flow path, a low velocity boundary layer fluid adjacent to the stagnant fluid, and a mainstream fluid adjacent to the boundary layer in a central region of the flow path. As the combustion gas passes through the diffuser, the velocity of the mainstream fluid is reduced as the cross-sectional area of the diffusing flow path expands. However, based on the reduction in velocity of the mainstream fluid, the velocity of the boundary layer fluid is also reduced, the region of the stagnant fluid within the boundary layer tends to increase and the boundary layer becomes more separated from the surface of the diffuser, thereby reducing the effective cross-sectional area available for diffusion of mainstream fluid within the diffuser. A number of conventional approaches have been offered to control the separation of the boundary layer within the diffusing flow path.

One conventional approach involves positioning flow obstruction devices, such as triangular-shaped delta wings or prism-shaped wedges, within the mainstream flow of the diffusing flow path, to deflect the mainstream flow into the boundary layer, in an effort to energize the boundary layer. However, the effectiveness of the flow obstruction devices is dictated by the boundary layer thickness of the boundary layer at the flow obstruction devices and the orientation of the flow obstruction devices relative to the flow angle of the mainstream fluid. Additionally, since the flow obstruction devices utilize the momentum of the mainstream fluid, they introduce an undesirable total-pressure loss on the mainstream fluid.

Another conventional approach involves a blower arrangement in which an opening in a surface of the diffuser is used to introduce fluid against the boundary layer. This fluid impacts the stagnant fluid within the boundary layer but does not, however, have the necessary characteristics to mix the mainstream fluid adjacent to the boundary layer with the stagnant fluid in the boundary layer.

Thus, it would be advantageous to control the stagnant fluid in the boundary layer within the diffusing flow path and improve the effectiveness of the diffuser, without the necessary drawbacks of the conventional approaches articulated above.

BRIEF DESCRIPTION OF THE DRAWINGS

The invention is explained in the following description in view of the drawings that show.

DETAILED DESCRIPTION OF THE INVENTION

The present inventor has recognized several limitations of the conventional approaches used to control the stagnant fluid in the boundary layer within the diffusing flow path of a diffuser. As discussed above, the effectiveness of the conventional flow obstruction devices are inherently limited by the boundary layer thickness at the flow obstruction devices and the orientation of the flow obstruction devices relative to the flow angle of the mainstream fluid. The present inventor has recognized that these inherent limitations arise due to positioning the flow obstruction devices within the diffusing flow path. Thus, the present inventor has recognized that a more effective approach would involve initiating the control of the boundary layer from outside of the diffusing flow path.

Additionally the present inventor has recognized that while the conventional blower arrangement does introduce fluid into the diffusing flow path from outside of the flow path, the introduced fluid through the opening in the diffuser surface has linear momentum which lacks the necessary vorticity to mix the mainstream fluid adjacent to the boundary layer with the stagnant fluid in the boundary layer in order to fully energize the stagnant fluid and thereby control the boundary layer. Accordingly, the present inventor has designed an apparatus which introduces fluid from outside of the diffusing flow path into the diffusing flow path with a necessary vorticity to mix the mainstream fluid adjacent to the boundary layer with the stagnant fluid in the boundary layer and fully energize the stagnant fluid and thereby control the boundary layer.

The present inventor has designed an apparatus which introduces fluid from outside of the diffusing flow path and into the diffusing flow path, where the introduced fluid creates a vortex structure that has a diameter that is equal to or greater than the boundary layer thickness of the boundary layer where the fluid is introduced, such that the vortex structure created by the introduced fluid extends from the stagnant fluid in the boundary layer into the mainstream fluid adjacent to the boundary layer, to mix the mainstream fluid with the stagnant fluid and control the boundary layer.

Figure 1:
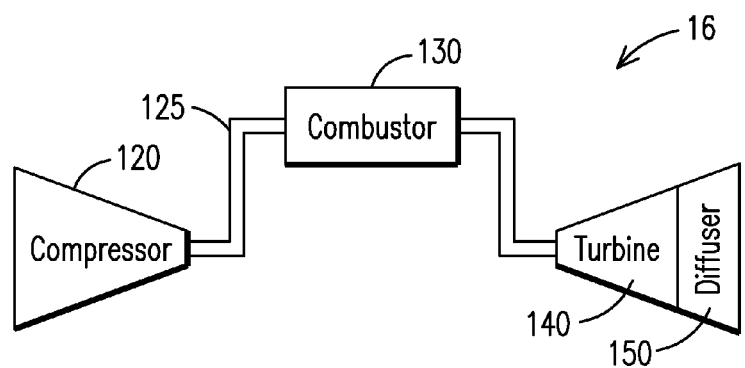
FIG. 1 is a schematic block diagram of a gas turbine engine.

FIG. 1 illustrates a gas turbine engine 16 including a compressor 120, a combustor 130 and a turbine 140. The compressor 120 compresses air, which is then passed through a diffuser 125 to expand the compressed air before it enters the combustor 130. The combustor 130 combines the compressed air with a fuel and ignites the mixture creating combustion products defining a combustion gas. The combustion gas travels to the turbine 140. Within the turbine 140 are rotating blades typically but not necessarily preceded by vanes which together comprise a stage. Typically, there are one to four stages in a turbine. The rotating blades are coupled to or in part integral with a shaft and disc assembly. As the combustion gas expands through the turbine 140, the combustion gas causes the blades, and therefore the shaft and disc assembly, to rotate. Upon exiting the turbine 140, the combustion gas passes into a diffuser 150 to diffuse the combustion gas before exiting the gas turbine engine 16 or before entering a Heat Recovery Steam Generator (not shown), for example. Although the illustrated embodiments of the invention discuss an apparatus 10 for controlling a boundary layer in a diffusing flow path 14 of the diffuser 150 at the outlet of the turbine 140, the apparatus may be similarly utilized with the diffuser 125 at the outlet of the compressor 120 within the gas turbine engine 16 or any diffuser, and is not limited to a power generating machine.

Figure 2A:
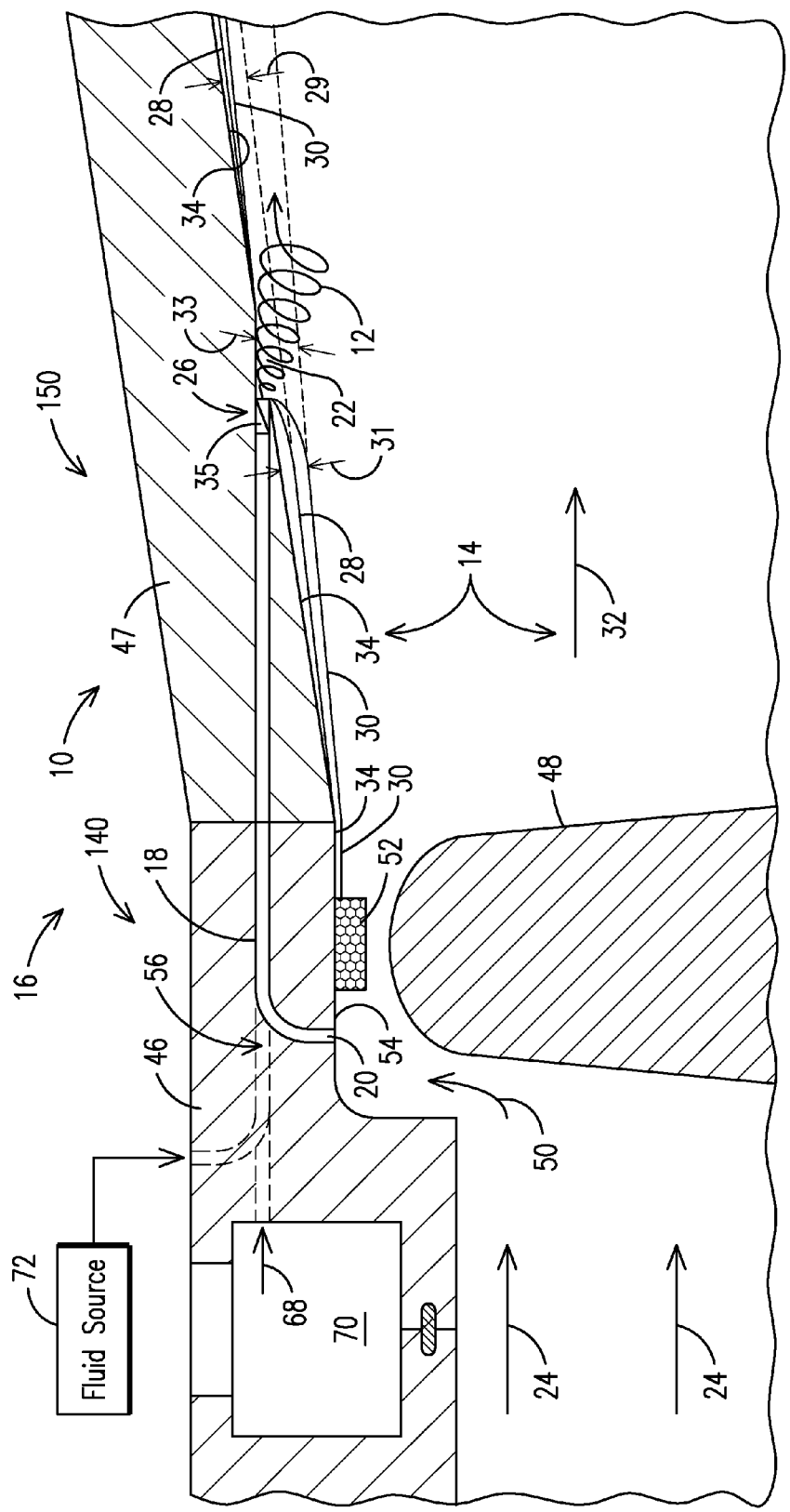
FIG. 2A is a partial cross-sectional view of an apparatus for controlling a boundary layer in a diffusing flow path of the gas turbine engine of FIG. 1.
Figure 2B:
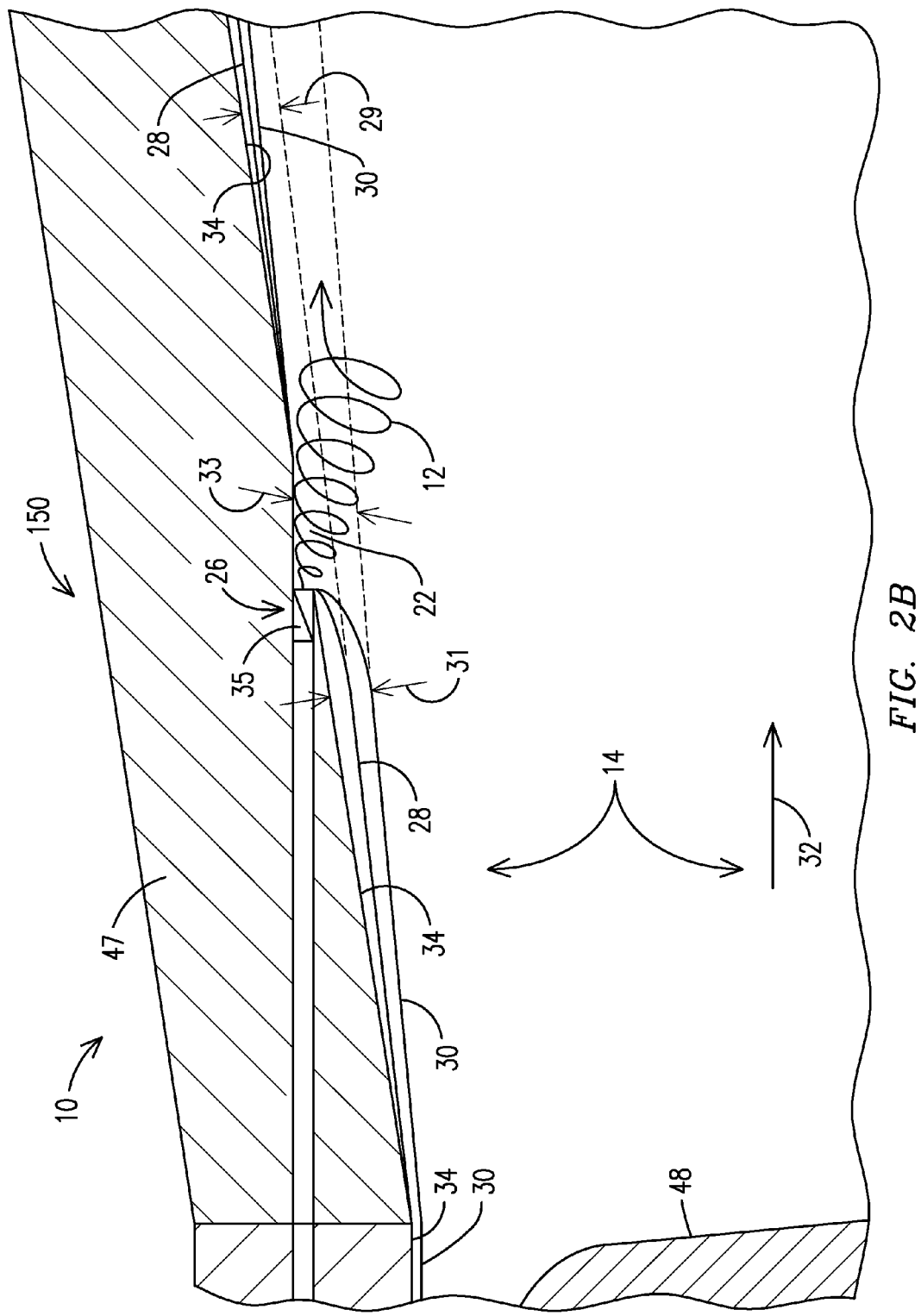
FIG. 2B is a partial cross-sectional view of a diffuser of the gas turbine engine illustrated in FIG. 2A.

FIGS. 2A and 2B illustrate an apparatus 10 for controlling a boundary layer 30 in a diffusing flow path 14 of the diffuser 150 at the outlet of the turbine 140 in the gas turbine engine 16. The outlet of the turbine 140 includes a last stage 48 of the turbine 140 with a stationary shroud 46 along an outer diameter of the last stage 48, which is coupled to a wall 47 of the diffuser 150, to accommodate the flow of combustion gas into the diffuser 150 and to initiate the diffusing flow path 14. The apparatus 10 is also for enhancing the diffusion of the diffusing flow path 14 within the diffuser 150 of the gas turbine engine 16, so as to reduce the required length to diffuse the combustion gas.

Specifically, the diffusing flow path 14 includes a boundary layer 30 comprised of stagnant fluid 28 along an outer surface of the diffusing flow path 14, a low velocity boundary layer fluid adjacent to the stagnant fluid 28, and a mainstream fluid 32 that is in a central portion of the diffusing flow path 14 adjacent to the boundary layer 30. As the diffusing flow path 14 propagates along the diffuser 150, the velocity of the mainstream fluid 32 is reduced as the cross-sectional area of the diffusing flow path 14 expands. Subsequently, the velocity of the boundary layer fluid within the boundary layer 30 is also reduced, which in-turn tends to increase the boundary layer thickness 31 of the boundary layer 30. If the apparatus 10 were not implemented in the diffusing flow path 14, the boundary layer 30 would continue to increase along the diffuser and consequently the region of stagnant fluid 28 would increase to a stagnant fluid thickness 29 illustrated in FIGS. 2A and 2B, thereby reducing the effective cross-sectional area available for the diffusion of the mainstream fluid 32 within the flow path 14 and hence reduce the effectiveness of the diffuser 150.

As illustrated in the exemplary embodiment of FIG. 2A, the apparatus 10 includes a passage 18 which passes from the stationary shroud 46 of the last stage 48 of the turbine 140 into the wall 47 of the diffuser 150. The passage 18 includes the inlet 20 positioned within the stationary shroud 46 and an outlet 22 positioned within the wall 47 of the diffuser 150. However, the embodiments of the present invention are not limited to this arrangement and the inlet 20 and outlet 22 may be both positioned within the stationary shroud 46 such that the passage 18 extends within the stationary shroud 46. Alternatively, the inlet 20 and the outlet 22 may be both positioned within the diffuser wall 47 such that the passage 18 extends within the diffuser 150. As illustrated in the exemplary embodiment of FIG. 2A, the passage 18 is positioned upstream of a rub material 52 of the stationary shroud 46 of the last stage 48. The apparatus 10 further includes a fluid source coupled to the inlet 20 to transmit fluid into the passage 18. In the exemplary embodiment of FIG. 2A, the fluid source is a portion 50 of combustion gas 24 within the turbine 140 which bypasses the last stage 48 of the turbine 140 and enters the inlet 20 of the passage 18. The inlet 20 is aligned in a direction parallel to an incoming direction of fluid, to minimize a pressure drop of gas entering the inlet 20. Although FIG. 2A illustrates that the inlet 20 is positioned upstream of the rub material 52 of the stationary shroud 46, the inlet may be positioned at any location along an inner surface 34 of the stationary shroud 46, provided that it is capable of receiving the portion 50 of combustion gas 24 from the turbine 140. Additionally, although FIG. 2A illustrates that the inlet 20 is aligned in a direction parallel to the incoming direction of fluid, the inlet 20 need not be aligned in this direction, and may be aligned in any direction relative to the incoming direction of fluid, provided that the inflow of the portion 50 of combustion gas 24 into the inlet 20 does not experience a pressure drop above an acceptable threshold. Although FIG. 2A illustrates that the fluid source to the inlet 20 of the passage 18 is the combustion gas 24 within the turbine 140, the embodiments of the present invention are not limited to this fluid source. For example, the fluid source may be compressed air 68 from a cavity 70 between adjacent stationary shrouds of adjacent stages of the turbine 140, as illustrated in FIG. 2A. In another example, the fluid source may be an external fluid source 72 to the turbine 140, as illustrated in FIG. 2A. In an exemplary embodiment, a first portion of the passage 18 including the inlet 20 is relatively straight, after which the passage 18 includes an arcuate portion to a second portion of the passage 18 including the outlet 22.

FIGS. 2A and 2B further illustrate that the apparatus 10 includes a vortex generator 26 positioned within the passage 18 and effective to generate a vortex fluid 12 at the outlet 22. In the exemplary embodiment of FIG. 2B, the vortex generator 26 is a swirler 35 that is positioned within the passage outlet 22, and includes a solid spiral-shaped piece positioned and mounted within the passage 18, to impart vorticity into the vortex fluid 12 at the outlet 22. In an exemplary embodiment, the passage 18 may be a conventionally drilled hole, and the swirler 35 is positioned at the outlet 22 of the drilled hole, for example. Although the embodiment of FIG. 2B illustrates one swirler 35 within the passage 18, more than one swirler may be positioned within the passage, depending on the desired vorticity pattern in the vortex fluid 12.

The vortex fluid 12 has a vorticity such that upon injecting the vortex fluid 12 into a region of two or more distinct fluid zones, the vortex fluid 12 mixes the fluids together. The vorticity of the vortex fluid 12 is based on one or more parameters of the vortex generator 26, which is discussed in greater detail below. The outlet 22 is positioned to inject the vortex fluid 12 into the diffusing flow path 14 of the diffuser 150 of the gas turbine engine 16 in order to control the boundary layer 30 of the diffusing flow path 14, in the manner discussed below. As illustrated in FIG. 2B, the diffusing flow path 14 includes the stagnant fluid 28 within the boundary layer 30 and the mainstream fluid 32 adjacent to the boundary layer 30. As appreciated by one of skill in the art, the stagnant fluid 28 has negligible velocity, and thus hinders the diffusion of the mainstream fluid 32 within the diffusing flow path 14 within the diffuser 150 of the gas turbine engine 16. As the diffusing flow path 14 propagates along the diffuser 150, the velocity of the mainstream fluid 32 is reduced, and, as previously discussed, consequently causes the region of stagnant fluid 28 within the boundary layer 30 to increase and the boundary layer becomes more separated from the surface 34 of the diffuser 150. The injected vortex fluid 12 mixes the mainstream fluid 32 with the stagnant fluid 28, in order to transfer momentum from the mainstream fluid 32 to the stagnant fluid 28. By transferring momentum from the mainstream fluid 32 adjacent to the boundary layer 30 to the stagnant fluid 28 within the boundary layer 30, the injected vortex fluid 12 energizes the stagnant fluid 28 within the boundary layer 30, thereby minimizing the extent of the region of stagnant fluid 28 and consequently minimizing the boundary layer thickness 31 of the boundary layer 30 which extends from the surface 34 of the diffuser 150 and encompasses the stagnant fluid 28. Effectively, the injected vortex fluid 12 redirects the mainstream fluid 32 toward the surface 34 of the wall 47 of the diffuser 150, thereby energizing the stagnant fluid 28. Thus, the injected vortex fluid 12 allows the boundary layer 30 and the stagnant fluid 28 to be controlled and confined to the surface 34 of the wall 47, rather than expanding away from the surface 34, and consequently reducing the effectiveness of the diffuser 150. Although the exemplary embodiment of FIG. 2B illustrates the vortex generator 26 within the passage 18, the embodiments of the present invention need not include a structural vortex generator positioned within the passage, provided that the passage is capable of generating a vortex fluid at the outlet.

As discussed above, in order to effectively transfer momentum from the mainstream fluid 32 to the stagnant fluid 28, the vortex fluid 12 mixes the mainstream fluid 32 with the stagnant fluid 28. The inventor of the present invention recognized that in order for the vortex fluid 12 to effectively mix the mainstream fluid 32, which is positioned adjacent to the boundary layer 30, with the stagnant fluid 28, which is positioned within the boundary layer 30, the vorticity of the vortex fluid 12 should be capable of reaching from the stagnant fluid 28 within the boundary layer 30 to the mainstream fluid 32 adjacent to the boundary layer 30. Thus, as illustrated in FIG. 2B, the vortex generator 26 is configured such that the generated vortex structure of vortex fluid 12 has a vortex diameter 33 which is greater than the boundary layer thickness 31 of the boundary layer 30 at the outlet 22. The vortex fluid 12 can then reach from the stagnant fluid 28 to the mainstream fluid 32 and effectively mix and transfer momentum from the mainstream fluid 32 to the stagnant fluid 28. Since the boundary layer thickness 31 of the boundary layer 30 varies as the diffusing flow path 14 propagates within the diffuser 150, the required diameter of the vortex structure of the vortex fluid 12 would similarly vary if the outlet 22 was repositioned at a different location along the wall 47 of the diffuser 150. For example, if the outlet 22 were repositioned to be further downstream along the diffusing flow path 14, the passage 18 and vortex generator 26 would need to generate a vortex structure of the vortex fluid that has a greater diameter than the vortex diameter 33 of the vortex fluid 12 shown in FIG. 2B, since the boundary layer thickness 31 of the boundary layer 30 would be larger at this repositioned outlet. Thus, when the passage 18 and the vortex generator 26 are designed, the outlet location 22 within the diffusing flow path 14 (and boundary layer thickness 31) are first determined, in order to configure the passage 18 and the vortex generator 26 to output a vortex structure of the vortex fluid 12 with the required vortex diameter 33.

Figure 4:
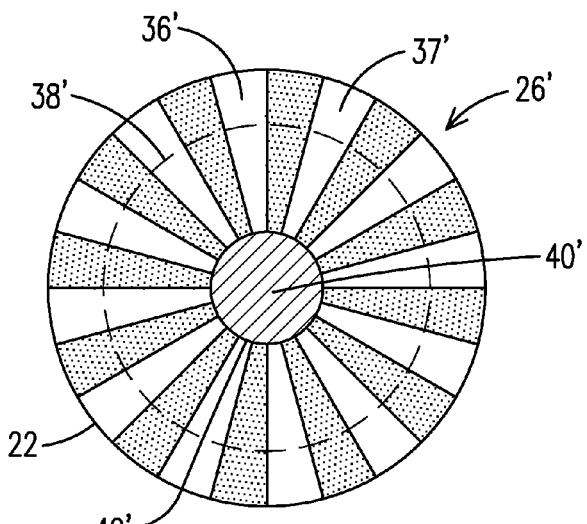
FIG. 4 is a cross-sectional view of an outlet of the apparatus of FIG. 2A and FIG. 2B.
Figure 5:
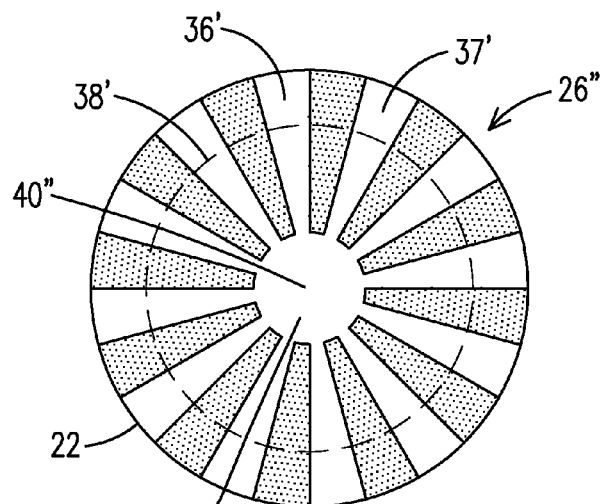
FIG. 5 is a cross-sectional view of an alternative outlet of the apparatus of FIG. 2A and FIG. 2B.

Although the exemplary embodiment of FIG. 2B illustrates that the vortex generator 26 is a swirler 35 inserted within the outlet 22, other embodiments of the present invention provide alternative vortex generators which may be employed to impart vorticity into the vortex fluid 12. For example, FIG. 4 illustrates a cross-sectional end view of the outlet 22 with an alternative vortex generator 26' that includes a plurality of swirler channels 36',37' within the passage 18. The swirler channels 36',37' are positioned in an outer portion 38' at an outer radial portion of the outlet 22. The swirler channels 36',37' are cast using a microfabrication casting technique which may be used to cast the vortex generator 26' as an insert to be positioned within the outlet 22 of the separately fabricated wall 47. In an exemplary embodiment, the microfabrication casting technique may be employed for purposes of the relatively small dimensions of the swirler channels 36',37' compared to the relatively large dimensions of the diffuser 150, and to finely tune the precise curvature of the swirler channels 36',37' using swirlers during the casting process, for example. In an exemplary embodiment, after the microfabrication casting technique has been utilized to cast the swirler channels 36',37' of the vortex generator 26', the vortex generator 26' may be inserted within the outlet 22 of a conventionally drilled hole which forms the passage 18 within the diffuser 150, for example. As illustrated in FIG. 4, the vortex generator 26' further comprises a solid core 40' within a central portion 42' of the passage. The central portion 42' is located at an inner radial portion of the outlet 22, in contrast with the outer portion 38' at an outer radial portion of the outlet 22. The swirler channels 36',37' are disposed about the solid core 40' such that the solid core 40' redirects fluid from the central portion 42' into the swirler channels 36',37', to generate increased vorticity in the vortex fluid 12 exiting the outlet 22. In another example, FIG. 5 illustrates a cross-sectional end view of the outlet 22 with an alternative vortex generator 26" that is similar to the vortex generator 26' of FIG. 4 but includes a hollow core 40" rather than the solid core 40' within the central portion 42' of the passage 18. The swirler channels 36',37' are disposed about the hollow core 40" in the same manner as the swirler channels 36',37' are disposed about the solid core 40' in the vortex generator 26' of FIG. 4. During operation of the vortex generator 26", fluid within the swirler channels 36',37' will tend to entrain fluid from the hollow core 40" along with the fluid within the swirler channels 36',37', which increases the vorticity of the fluid within the hollow core 40', and thus improves the vortex structure of vortex fluid 12 at the outlet 22. The vorticity generated by the swirler channels of FIGS. 4-5 or the swirler of FIG. 2B is based on various characteristics of the swirler channels or swirler, such as a turn radius of the swirler channel/swirler, and/or a number of rotations per unit length of the swirler channels/swirler. For example, an increased number of rotations per unit length of the swirler channels/swirler of the vortex generator may improve the vorticity of the vortex fluid. Although FIGS. 4 and 5 illustrate that the outlet 22 of the passage 18 would be circular, the outlet need not be circular, and may take an arc-portion shape such that a plurality of outlets collectively form an arc shape around a circumference of the diffuser 150. In an exemplary embodiment, the vortex generator of each outlet may be individually cast into a separate block using the microfabrication casting technique and inserted within each arc-portion outlet, such that a plurality of vortex generators inject vortex fluid into the diffusing flow path 14 from around the circumference of the diffuser 150.

Figure 3:
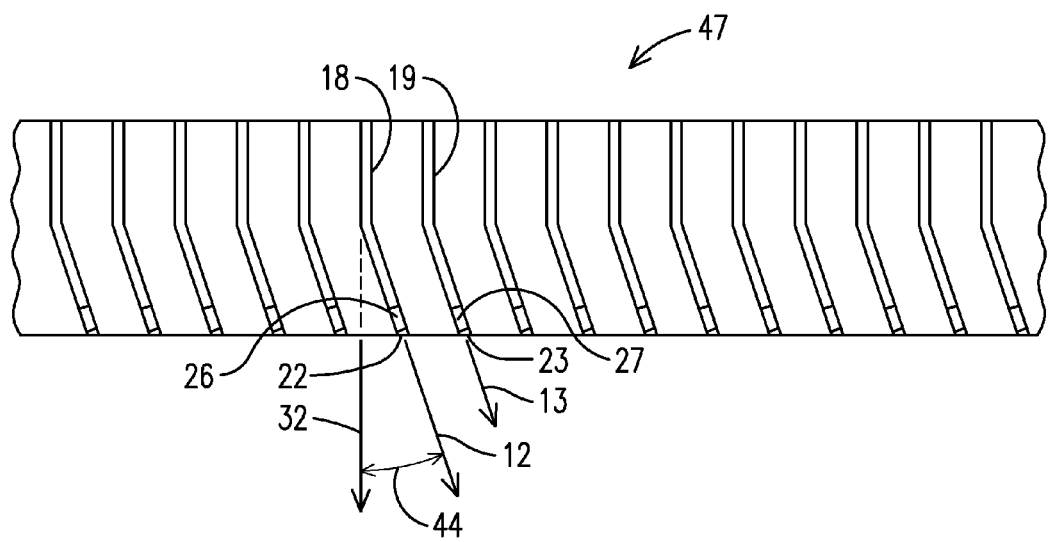
FIG. 3 is a partial top view of a diffuser wall of the apparatus of FIG. 2A and FIG. 2B.

FIG. 3 illustrates a top down cut-away view of the diffuser wall 47 in which a plurality of passages 18,19 pass and terminate at the respective outlet 22,23. A respective vortex generator 26,27 is positioned within the respective passages 18,19 to generate a respective vortex structure of vortex fluid 12,13 exiting at the adjacent outlets 22,23 of the passages 18,19. In an exemplary embodiment, the vortex generators 26,27 of adjacent passages 18,19 are configured to rotate the vortex fluid 12,13 from adjacent passage outlets 22,23 in opposite directions. By rotating the vortex fluid 12,13 from adjacent passage outlets 22,23 in opposite directions, the collective impact of the vorticity of the vortex fluid 12,13 injected into the diffusing flow path 14 is enhanced, to accelerate the transfer of momentum from the mainstream fluid 32 to the stagnant fluid 28. In another exemplary embodiment, the vortex generators 26,27 of adjacent passages 18,19 are configured to rotate the vortex fluid 12,13 from adjacent outlets 22,23 in the same direction to achieve a different characteristic transfer of momentum from the mainstream fluid 32 to the stagnant fluid 28. As further illustrated in FIG. 3, the outlet 22 is oriented at an angle 44 relative to the direction of the mainstream fluid 32 within the diffusing flow path 14. The angle 44 is selectively controlled to introduce an angular shear between the injected vortex fluid 12 and the mainstream fluid 32 of the diffusing flow path 14, to enhance the transfer of momentum from the mainstream fluid 32 to the stagnant fluid 28. In an exemplary embodiment, the angle 44 may be adjusted to be within 60 degrees of the direction of the mainstream fluid 32, based on the desired angular shear between the vortex fluid 12 and the mainstream fluid 32. The angular shear can be selectively increased by increasing the angle between the injected vortex fluid 12 and the mainstream fluid 32.

Figure 6:
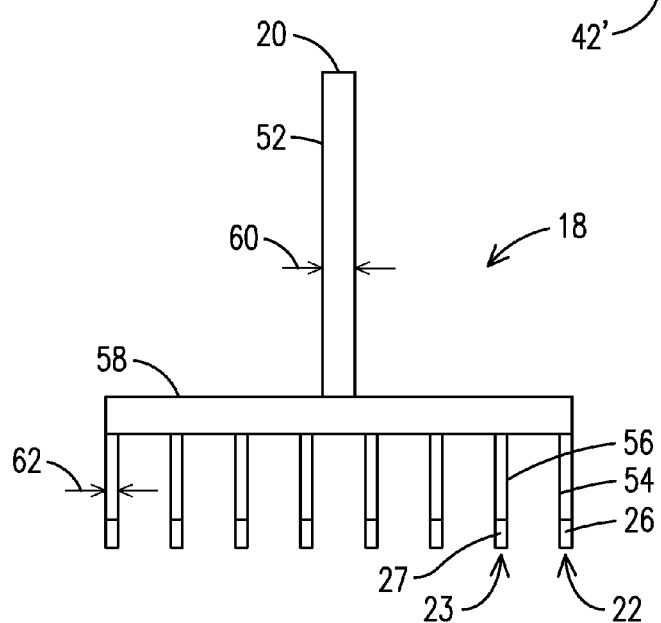
FIG. 6 is top cross-sectional view of a passage of the apparatus of FIG. 2A and FIG. 2B.

Although FIGS. 4-5 illustrate an embodiment with one channel and one vortex generator positioned within the passage, the embodiments of the present invention are not limited to this arrangement, and may include a plurality of channels with a respective plurality of vortex generators within the passage. As illustrated in FIG. 6, the passage 18 includes one channel 52 coupled to the inlet 20, a plurality of outlet channels 54,56 with a respective plurality of vortex generators 26,27 coupled to a respective outlet 22,23, and a manifold coupling 58 between the inlet channel 52 and the outlet channels 54,56. Thus, for example, each of the outlet channels 54,56 may include a respective plurality of swirler channels 36',37', as illustrated in FIG. 4 or a swirler 35, as illustrated in FIG. 2B, to generate vortex fluid from the outlets 22,23. As previously discussed, the vortex generators 26,27 of the outlet channels 54,56 may be configured such that the vortex fluid from the outlets 22,23 rotates in the same or opposite directions. In an exemplary embodiment, the vortex fluid from the outlet channels 54,56 rotates in the same or opposite directions based upon the swirler channels 36,37 (or swirler 35) of the outlet channels 54,56 rotating in a respective same or opposite direction, for example. Although FIG. 6 illustrates a passage 18 including one inlet channel 52 which branches out at the manifold coupling 58 to eight outlet channels, this passage is merely exemplary and the passage may include any transition from any number of inlet channel(s) to any number of outlet channels regardless of the number of inlet channel(s), provided that the transition at the manifold coupling does not experience a drop in total pressure above a threshold level. As further illustrated in FIG. 6, a diameter 60 of the inlet channel 52 is greater than a respective diameter 62 of the outlet channels 54,56. Since the inlet channel diameter 60 is greater than the outlet channel diameter 62, the fluid will not experience an appreciable drop in pressure as it passes through the inlet channel 52, before entering the outlet channels 54,56. Although the embodiments of FIGS. 4-6 illustrate one vortex generator positioned within each outlet channel, the embodiments of the present invention are not limited to this arrangement and may include more than one vortex generator within each outlet channel.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus for controlling a boundary layer in a diffusing flow path of a power generating machine, said apparatus comprising:
a passage in the power generating machine, said passage being separate from the diffusing flow path and having an inlet and an outlet;
a fluid source coupled to the inlet to transmit fluid into the passage; and
a vortex generator within the passage effective to generate a vortex fluid at the outlet, wherein said outlet is positioned to inject the vortex fluid from outside the diffusing flow path into the diffusing flow path of the power generating machine in order to control the boundary layer of the diffusing flow path;
wherein the vortex generator includes a plurality of swirler channels within the passage, and wherein said swirler channels are positioned in an outer portion of the passage.

2. The apparatus of claim 1, wherein said diffusing flow path includes a stagnant fluid within the boundary layer and a mainstream fluid adjacent to the boundary layer; wherein said injected vortex fluid is configured to mix the mainstream fluid with the stagnant fluid.

3. The apparatus of claim 1, wherein said injected vortex fluid is configured to energize a stagnant fluid within the boundary layer of the diffusing flow path of the power generating machine to minimize the boundary layer within the diffusing flow path.

4. The apparatus of claim 1, wherein the vortex generator further comprises a solid core within a central portion of the passage, wherein the swirler channels are disposed about the solid core such that said solid core is configured to redirect fluid from the central portion into the swirler channels.

5. The apparatus of claim 1, wherein the vortex generator further comprises a hollow core within a central portion of the passage, and wherein the swirler channels are disposed about the hollow core.

6. The apparatus of claim 1, further comprising a plurality of passages and a respective vortex generator configured to generate a respective vortex in the respective fluid exiting each passage outlet, wherein the adjacent vortex generators are configured to rotate the vortex fluid from adjacent passage outlets with a vorticity in a same or opposite directions.

7. The apparatus of claim 1, wherein the outlet is oriented at an angle relative to a direction of the diffusing flow path within the power generating machine.

8. The apparatus of claim 1, wherein said passage is in a stationary shroud of a last stage of a gas turbine engine; and wherein a portion of combustion gas within the gas turbine engine is configured to bypass the last stage and enter the passage inlet.

9. The apparatus of claim 1 wherein the passage includes one channel coupled to the inlet, a plurality of outlet channels with a respective plurality of vortex generators, and a manifold coupling between the inlet channel and the outlet channels.

10. An apparatus to enhance the diffusion of a flow path within a diffuser of a power generating machine, wherein the flow path includes a stagnant fluid within a boundary layer of the flow path and a mainstream fluid adjacent to the boundary layer, said apparatus comprising:
a passage through a wall of the diffuser, said passage including an inlet and an outlet into the flow path; said passage configured to receive fluid in the inlet and further configured to generate a vortex fluid at the outlet;

wherein said vortex fluid is injected into the flow path to mix the mainstream fluid with the stagnant fluid such that the stagnant fluid within the boundary layer is controlled;

wherein said passage includes at least one swirler channel configured to generate the vortex fluid to be injected from the outlet into the flow path.

11. The apparatus of claim 10, wherein said power generating machine is a gas turbine engine; and wherein said passage is configured to receive combustion gas from within the gas turbine engine, compressed air from a cavity adjacent to a rotating blade of the gas turbine engine or a fluid source external to the gas turbine engine; and wherein said diffusing flow path is positioned adjacent to an outlet of the rotating blade.

12. An apparatus for controlling a boundary layer in a diffusing flow path of a diffuser, said apparatus comprising:

a wall of the diffuser;

a vortex generator having an outlet in the wall for injecting a vortex fluid into the diffusion flow path of the diffuser for controlling the boundary layer; and a passage within the wall, wherein said vortex generator is positioned within the passage, and wherein said vortex generator includes at least one swirler channel to generate the vortex fluid at the outlet.

13. The apparatus of claim 12, wherein a diameter of the vortex fluid injected from the outlet is greater than a thickness of the boundary layer along the wall at the outlet.

14. The apparatus of claim 12, wherein the vortex generator further comprises a solid core within a central portion of the passage, and wherein the vortex generator includes a plurality of swirler channels disposed about the solid core such that said solid core is configured to redirect fluid from the central portion into the swirler channels, to generate the vortex in the fluid exiting the passage outlet.

15. The apparatus of claim 12, wherein the vortex generator further comprises a hollow core within a central portion of the passage, wherein the vortex generator further comprises a plurality of swirler channels, and wherein the swirler channels are disposed about the hollow core.

* * * * *